United States Patent
Meyer et al.

[11] Patent Number: 5,299,469
[45] Date of Patent: Apr. 5, 1994

[54] ADJUSTABLE LINKAGE ASSEMBLY

[75] Inventors: Morris A. Meyer, Dublin; Wilbur L. Darst, Stoutsville, both of Ohio

[73] Assignee: Amanda Bent Bolt Co., Logan, Ohio

[21] Appl. No.: 20,350

[22] Filed: Feb. 22, 1993

[51] Int. Cl.[5] .......................... G05G 1/00; F16B 9/00
[52] U.S. Cl. ........................................ 74/586; 74/595; 403/71; 403/104
[58] Field of Search .................. 403/71 X, 274, 279, 403/284, 83, 104 X, 186; 74/595, 579 R, 586 X

[56] References Cited

U.S. PATENT DOCUMENTS

| | | | |
|---|---|---|---|
| 2,837,934 | 6/1958 | Edmundson | 74/586 |
| 2,839,949 | 6/1958 | Buell et al. | 74/586 |
| 3,103,692 | 9/1963 | Ruck et al. | 74/586 X |
| 3,770,169 | 11/1973 | Roach | 74/586 X |
| 3,782,221 | 1/1974 | Nalodka et al. | 74/586 |
| 3,965,772 | 6/1976 | Hamisch | 74/586 |
| 4,875,388 | 10/1989 | Bouvot | 74/595 |
| 4,944,066 | 7/1990 | Fayngersh et al. | 403/104 X |
| 5,042,588 | 8/1991 | Herchenbach et al. | 74/586 X |
| 5,176,044 | 1/1993 | Bauer et al. | 74/595 |

FOREIGN PATENT DOCUMENTS

| | | | |
|---|---|---|---|
| 155758 | 3/1954 | Australia | 74/586 |
| 3028868 | 2/1982 | Fed. Rep. of Germany | 74/586 |
| 591456 | 4/1959 | Italy | 74/586 |
| 974167 | 11/1964 | United Kingdom | 74/586 |

*Primary Examiner*—Vinh T. Luong
*Attorney, Agent, or Firm*—Thomas S. Baker, Jr.

[57] ABSTRACT

An adjustable linkage assembly has a longitudinally extending body member with a central section and a spaced pair of flattened portions at each end thereof. An opening is formed in each of the flattened portions and one of the openings is elongated. Each opening receives a trunnion.

9 Claims, 1 Drawing Sheet

ADJUSTABLE LINKAGE ASSEMBLY

BACKGROUND OF THE INVENTION

1. FIELD OF THE INVENTION

This invention relates to a linkage assembly adapted to be incorporated in a gear shift control lever assembly for the transmission of a motor vehicle.

2. DESCRIPTION OF THE PRIOR ART

A linkage assembly of the type used in a transmission gear shift control lever assembly transmits motion input to a gear shift lever by an operator to shifting levers pivotally attached to the outer housing of a transmission. The shifting levers drive shift forks which move synchronizers mounted on rotating shafts into and out of contact with gears in the transmission to thereby change the gear ratio output by the transmission. Linkage assemblies used in gear shift control lever assemblies must be adjustable and must be capable of maintaining an adjustment setting for a prolonged period of time.

One prior adjustable linkage assembly incorporates a pair of spaced trunnions. The assembly may be adjusted to change the spacing between the trunnions. This assembly consists of a rod having one end bent 90 degrees. A trunnion is machined onto the end that has been bent to provide a first trunnion which extends laterally with respect to the longitudinal axis of the rod. A flat is machined along the outer surface of the longitudinally extending portion of the rod to cause the rod to have a D-shaped outer surface. A second trunnion is mounted in a clamp adapted to be mounted on the longitudinally extending portion of the rod. The clamp includes a U-shaped steel stamping having a pair of aligned D-shaped holes which complement the outer surface of the rod. An anchor bolt is received within a tapped hole in the clamp to rigidly anchor the clamp. The trunnion is mounted in the clamp such that it projects laterally from the longitudinally extending rod and 180 degrees from the direction of the first trunnion when the clamp is mounted on the rod. The threaded bore which receives the tightening bolt is laterally aligned with the flat formed on the rod such that the tightening bolt bears against the flat to anchor the second trunnion at a desired distance from the first trunnion.

One disadvantage of this assembly relates to its cost inasmuch as the rod requires extensive machining to form a trunnion at one end and to provide a D-shaped cross section on the outer surface thereof. Additionally, it has been found difficult to precisely form the "D" shaped holes in the clamp and to mount a trunnion on the clamp with the precision required to provide precise orientation of the two trunnions with respect to each other.

Accordingly, it is desirable to provide a linkage assembly having a pair of trunnions which requires minimal machining and is relatively inexpensive to manufacture, which allows precise orientation of the trunnions with respect to each other, which may be adjusted easily and which will hold an adjustment once it has been set.

SUMMARY OF THE INVENTION

An adjustable linkage assembly includes a rigid longitudinally extending body member having a central section and a spaced pair of flattened portions each having a top surface and a bottom surface at each end of the central section. A first opening extending between the top and bottom surfaces is formed in the flattened portion at one end of the body member. An elongated second opening extending between the top and bottom surfaces is formed in the flattened portion at the opposite end of the body member. A first trunnion assembly having a first trunnion and a first mounting element is connected to the body member by having the first mounting element project through the first opening. A second trunnion assembly having a second trunnion and a second mounting element projects through the elongated second opening to attach the second trunnion assembly to the flattened portion at the opposite end of the body member. The second mounting element is movable in the second opening to adjust the distance between the first and second trunnions.

DESCRIPTION OF THE PREFERRED EMBODIMENT

Figure 1:
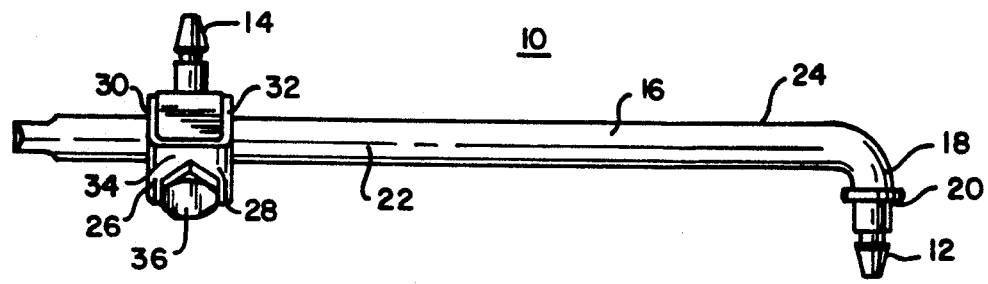
FIG. 1 is a prior art adjustable linkage assembly.

An adjustable linkage assembly (10) which constitutes prior art in connection with the subject invention may be seen by referring to FIG. 1. Linkage assembly (10) provides a means of adjusting the space in between a pair of trunnions (12 and 14) which extend in opposite directions from each other. In linkage assembly (10), a metal rod (16) has one end (18) bent at 90 degrees. Trunnion (12) and a collar (20) are machined onto the end (18) to provide a rigidly affixed trunnion at one end of the assembly.

A flat (22) is formed on the outer surface (24) of rod (16) coaxial with the longitudinal axis of rod (16). This provides a "D" shaped outer surface for rod (16).

The trunnion (14) is rigidly affixed to a bracket assembly (26) such that trunnion (14) projects at an angle 180 degrees from the direction trunnion (12) projects. Bracket assembly (26) includes a U-shaped bracket (28) having a pair of legs (30 and 32) joined by a central section (34). The legs (30 and 32) have aligned D-shaped holes which complement the outer surface of rod (16). Consequently, bracket assembly (26) may be mounted on rod (16) to provide a proper directional orientation for trunnion (14).

Central section (34) has a threaded hole which receives a threaded bolt (36). Bolt (36) is tightened against the flat (22) to provide the proper distance between the trunnions (12 and 14). Assembly (10) requires extensive machining and is relatively expensive to manufacture.

Figure 2:
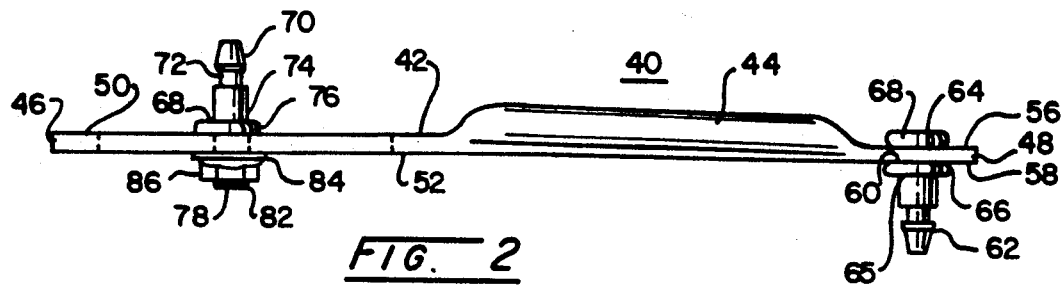
FIG. 2 is a side view of the linkage assembly of the instant invention.
Figure 3:
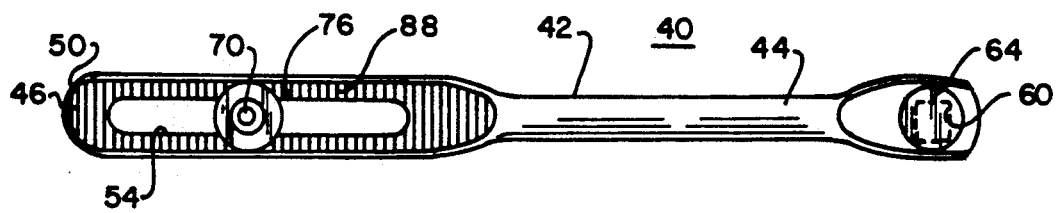
FIG. 3 is a plan view of the linkage assembly of the instant invention.

The adjustable linkage assembly (40) of the instant invention may be seen by referring to FIGS. 2 and 3. Linkage assembly (40) has a rigid longitudinally extending body member (42) which may be formed from a metal rod. Body member (42) has a generally circular center section (44) and a spaced pair of flattened portions (46 and 48) at each end thereof. While in the embodiment described herein the flattened sections (46 and 48) have been formed from a circular rod to provide an optimum strength to weight ratio, it should be noted that body member (42) also could be formed from a single longitudinally extending flat piece of metal.

Flattened section (46) has a generally flat top surface (50) and a generally flat bottom surface (52) which extends parallel to surface (50). A longitudinally extending elongated opening (54) is formed in the flattened section (46). Opening (54) extends between the top and bottom surfaces (50 and 52) respectively. Flattened section (48) is defined by generally parallel, flat top and bottom surfaces (56 and 58). An opening (60) is formed in flattened section (48). Opening (60) which may be rectangular or any other non-circular shape extends between the top and bottom surfaces (56 and 58).

A trunnion (62) is attached to a rectangular mounting element (64) to provide a trunnion assembly (65). Element (64) projects upwardly from the top of the trunnion (62) and projects through the opening (60) defined in flattened section (48). A collar (66) is formed on mounting element (64) to prevent trunnion (62) from being drawn into the opening (60). Trunnion (62) is rigidly secured to section (48) by having the outer end of mounting element (64) upset such as by hammering to provide a head (68) which prevents the mounting element (64) from being withdrawn from opening (60). In this manner, trunnion (62) is rigidly affixed to the outer end of body member (42). In the preferred embodiment of this invention the outer surface of mounting element (64) complements opening (60) such that trunnion (62) cannot rotate within the opening (60). Although, in FIGS. 2 and 3 the mounting element (64) is depicted as having a rectangular outer surface, the element (64) could have any other non-circular shape which complements that of opening (60).

Figure 4:
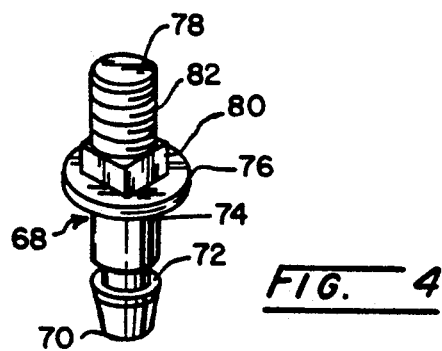
FIG. 4 is an enlarged view of one of the trunnions used in the subject linkage assembly.

A second trunnion assembly (68) having a trunnion (70) is mounted in the elongated opening (54) at the flattened section (46) of body member (42). FIG. 4 provides an enlarged view of trunnion assembly (68). The upper end (72) of trunnion (70) is attached to a mounting element (74). Mounting element (74) includes a collar (76) and a shank (78) which has a rectangular outer shaped surface (80) adjacent collar (76) and a circular threaded outer end (82). The rectangular shaped outer surface (80) is dimensionally sized to fit between the walls defining the elongated opening (54) but to prevent rotation of the assembly (68).

Turning to FIGS. 2 and 3, it may be observed that the threaded outer end (82) of mounting element (74) projects downwardly through the elongated opening (54). The rectangular shaped outer surface (80) of shank (78) fits between the side walls defining the elongated opening (54). The collar (76) prevents trunnion (70) from being drawn through the opening (54). A locking washer (84) is passed over the outer surface of outer end (82) and a nut (86) is threadably attached to the end (82) so as to secure the trunnion assembly (68) to the flattened section (46) of body member (42). It should be apparent that trunnion assembly (68) may be moved longitudinally within the elongated opening (54) to provide the desired distance between the trunnions (62 and 70).

Referring to FIG. 3, it may be observed that a plurality of serrations or indentations (88) are formed in the top surface (50) of flattened section (46) adjacent the side walls of the elongated opening (54). The serrations (88) function to grip collar (76) to prevent the trunnion assembly (68) from moving within the opening (54) subsequent to nut (86) being tightened. Serrations also may be formed in the bottom surface (52) and engage washer (84) to prevent rotation of the assembly (68).

From the above, it may be observed that the adjustable linkage assembly (40) of the instant invention provides a rigid mounting for a pair of trunnions. Additionally, the spacing between the trunnions may be adjusted easily and accurately.

Since certain changes may be made to the above-described structure and method without departing from the scope of the invention herein it is intended that all matter contained in the description thereof or shown in the accompanying drawings shall be interpreted as illustrative and not in a limiting sense.

We claim:

1. An adjustable linkage assembly which comprises:
    a rigid longitudinally extending body member having a central section and a spaced pair of flattened portions each having a top surface and a bottom surface one at each end thereof;
    a first opening extending between said top and bottom surfaces formed in said flattened portion at one end of said body member;
    an elongated second opening extending between said top and bottom surfaces formed in said flattened portion at the opposite end of said body member;
    a first trunnion assembly having a first trunnion and a first mounting element;
    wherein said first mounting element projects through said first opening to fixedly attach said first trunnion assembly to the flattened portion at said one end of said body member such that said first trunnion projects laterally from said body member;
    a second trunnion assembly having a second trunnion and a second mounting element;
    wherein said second mounting element projects through said elongated second opening to attach said second trunnion assembly to the flattened portion at said opposite end of said body member such that said second trunnion projects laterally from said body member; and
    wherein said second mounting element is movable in said second opening to adjust the distance between said first and said second trunnions.

2. The adjustable linkage assembly of claim 1 in which indentations are formed on at least one of the top and bottom surfaces of the flattened portion adjacent said second opening at said opposite end of said body member to prevent said second trunnion assembly from moving in said second opening.

3. The adjustable linkage assembly of claim 1 in which the walls defining said first opening define a rectangular opening and said opening complements the shape of the outer surface of said first mounting element to prevent rotation thereof.

4. The adjustable linkage assembly of claim 3 in which said first mounting element has an outer end remote from said first trunnion which projects beyond said first opening; and
    wherein said outer end is upset to secure said first trunnion assembly to said one end of said body member.

5. The adjustable linkage assembly of claim 1 in which said second mounting element has a threaded section which projects through said second opening adapted to receive a removable fastener to secure said second trunnion assembly to said opposite end of said body member.

6. The adjustable linkage assembly of claim 1 in which said second trunnion is mounted at one end of said second trunnion assembly, said second mounting element is mounted at said other end of said second trunnion assembly, a removable fastener engages said second mounting element to rigidly affix said second trunnion assembly at said opposite end of said body member and said second trunnion projects from said body member in a direction opposite from the direction said removable fastener projects from said body member.

7. The adjustable linkage assembly of claim 6 in which said first trunnion is mounted at one end of said first trunnion assembly, said first mounting element is mounted at the other end of said first trunnion assembly, fastening means on said first mounting element for fastening said first trunnion assembly at said one end of said body member and said first trunnion projects from said body member in a direction opposite from the direction said fastening means projects from said body member.

8. The adjustable linkage assembly of claim 1 in which a pair of parallel side walls define said elongated second opening;

said second mounting element includes a shank having at least one pair of parallel surfaces and each of said parallel surfaces lies adjacent one of said parallel side walls to thereby pivot rotation of said second mounting element in said second opening.

9. An adjustable linkage assembly which comprises:
a rigid longitudinally extending body member having a central section and a spaced pair of flattened portions each having a top surface and a bottom surface one at each end thereof;
a first opening extending between said top and bottom surfaces formed in said flattened portion at one end of said body member;
an elongated second opening extending between said top and bottom surfaces formed in said flattened portion at the opposite end of said body member;
a first trunnion assembly having a first trunnion and a first mounting element;
wherein said first mounting element projects through said first opening to fixedly attach said first trunnion assembly to the flattened portion at said one end of said body member such that said first trunnion projects laterally from said body member;
a second trunnion assembly having a second trunnion and a second mounting element;
wherein said second mounting element projects through said elongated second opening to attach said second trunnion assembly to the flattened portion at said opposite end of said body member such that said second trunnion projects laterally from said body member;
wherein said second mounting element is movable in said second opening to adjust the distance between said first and said second trunnions; and
wherein said central section of said body member has a cylindrical cross-sectional area.

* * * * *